(12) United States Patent
Lai

(10) Patent No.: US 11,764,709 B2
(45) Date of Patent: Sep. 19, 2023

(54) MOTOR CONTROLLER

(71) Applicant: Global Mixed-mode Technology Inc., Hsin-Chu (TW)

(72) Inventor: Ching-Feng Lai, Taipei (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 238 days.

(21) Appl. No.: 17/376,163

(22) Filed: Jul. 15, 2021

(65) Prior Publication Data

US 2023/0016249 A1    Jan. 19, 2023

(51) Int. Cl.
*H02P 23/12* (2006.01)
*H02P 6/15* (2016.01)

(52) U.S. Cl.
CPC ..................... *H02P 6/153* (2016.02)

(58) Field of Classification Search
CPC ........ H02P 29/66; H02P 29/024; H02P 6/153; H02P 6/18
USPC ..................................... 318/400.14
See application file for complete search history.

(56) References Cited

U.S. PATENT DOCUMENTS

| | | | | |
|---|---|---|---|---|
| 5,554,913 A * | 9/1996 | Ohsawa | ...................... | H02P 6/34 318/434 |
| 11,251,728 B2 * | 2/2022 | Tsuchihashi | .............. | H02P 8/12 |
| 2009/0001913 A1 * | 1/2009 | Takeuchi | ................... | H02P 6/16 318/400.04 |
| 2009/0009118 A1 * | 1/2009 | Takeuchi | ................... | H02P 6/16 318/400.38 |
| 2012/0049780 A1 * | 3/2012 | Maeda | ................. | H02P 23/0077 318/696 |
| 2014/0368148 A1 | 12/2014 | Kai | | |
| 2018/0294754 A1 * | 10/2018 | Takeda | ....................... | H02P 8/32 |
| 2021/0075348 A1 * | 3/2021 | Chen | ....................... | H02P 6/182 |

FOREIGN PATENT DOCUMENTS

| | | |
|---|---|---|
| CN | 202818200 U | 3/2013 |
| CN | 111682808 A | 9/2020 |
| TW | 301819 | 4/1997 |

* cited by examiner

*Primary Examiner* — Kawing Chan
*Assistant Examiner* — Gabriel Agared
(74) *Attorney, Agent, or Firm* — Winston Hsu

(57) ABSTRACT

A motor controller comprises a switch circuit and a control unit. The switch circuit is coupled to a motor for driving the motor. The control unit generates a control signal to control the switch circuit. The motor controller determines a non-excitation time. When the motor is in a locked state, the motor controller enables the non-excitation time to be a variable value. The motor controller utilizes the non-excitation time to achieve a lock protection function. The motor controller determines whether the motor is in the locked state by detecting a rotor speed or a rotor temperature. Moreover, the motor controller further comprises a driving signal, where the driving signal has the non-excitation time.

21 Claims, 6 Drawing Sheets

MOTOR CONTROLLER

BACKGROUND OF THE INVENTION

1. Field of the Invention

The present invention relates to a motor controller, and more particularly, to a motor controller which may be applied to a three-phase sensorless motor.

2. Description of the Prior Art

Conventionally, there are two driving methods for driving a motor. The first driving method uses the Hall sensor for switching phases, so as to drive the motor. The second driving method does not use the Hall sensor to drive the motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems. In the sensorless driving method, the motor controller switches phases by detecting the back electromotive force of the floating phase, so as to drive the motor.

FIG. 1 shows a timing chart of a conventional driving signal Vd, where the driving signal Vd has an excitation time and a non-excitation time. When the motor is affected by an external force, it results that the rotor of the motor is locked in a certain position. The coil of the motor keeps outputting the power, thereby resulting that the temperature increases tremendously. At this moment, the prior-art method adopts the fixed excitation time and the fixed non-excitation time for achieving a lock protection function. When the motor is operated within the excitation time, the temperature increases. On the contrary, when the motor is operated within the non-excitation time, the temperature decreases. Thus, the motor controller enables that the non-excitation time is larger than the excitation time, so as to decreasing the temperature. However, when the motor controller cannot start the motor in a first try, the motor controller needs to wait for one non-excitation time to restart the motor. It will result that the starting time is too long. Therefore, when the motor is in a locked state, a new technology is needed to increase a number of restarting times within a limited time and enhance a starting success rate.

SUMMARY OF THE INVENTION

According to the present invention, a motor controller which may increase a number of restarting times within a limited time and enhance a starting success rate is provided. The motor controller is used for driving a motor. The motor controller comprises a switch circuit, a control unit, a lock protection unit, a rotor detecting unit, a non-excitation time modulating unit, a counting unit, an input voltage detecting unit, and a temperature detecting unit. The switch circuit is coupled to the motor, so as to drive the motor. The control unit generates a control signal to the switch circuit, so as to control the switch circuit. The rotor detecting unit generates a first detecting signal to the lock protection unit, so as to inform the lock protection unit whether the motor is in a locked state. For example, the rotor detecting unit may determine whether the motor is in the locked state by detecting a rotor speed or a rotor temperature. The lock protection unit is coupled to the control unit, so as to generate a driving signal to the control unit, where the driving signal has an excitation time and a non-excitation time. When the motor is in the locked state, the motor controller may enable that the excitation time is a fixed value and the non-excitation time is a variable value, so as to achieve a lock protection function. The non-excitation time modulating unit generates a timing signal to the lock protection unit, so as to represent the non-excitation time. For example, the driving signal may have a first excitation time, a first non-excitation time, a second excitation time, a second non-excitation time, a third excitation time, and a third non-excitation time. The motor controller may enable that the first excitation time is equal to the second excitation time and the second excitation time is equal to the third excitation time. The motor controller may enable that the second non-excitation time is greater than the first non-excitation time and the third non-excitation time is greater than the second non-excitation time. By such control mechanism, the motor controller may increase the number of restarting times within the limited time and enhance the starting success rate. That is to say, the motor controller may solve a delayed start issue and increase the efficiency of the system. Moreover, the motor controller may enable that the second non-excitation time is greater than the second excitation time and the third non-excitation time is greater than the third excitation time, so as to decrease the temperature and achieve the lock protection function. According to the present invention, there are at least three embodiments as follows:

1. The motor controller enables that the non-excitation time is varied with a number of times. When the motor is in the locked state, the motor controller may enable that the non-excitation time of the first time is a smaller value while the non-excitation time of the second time is a larger value. That is, when the number of times increases, the non-excitation time increases. The counting unit may generate a counting signal to the non-excitation time modulating unit, so as to represent the number of times. The non-excitation time modulating unit may modulate the non-excitation time based on the counting signal. After the motor controller starts the motor successfully, the counting unit may be reset to recount the number of times. For example, the non-excitation time of the first time may be 5 seconds while the non-excitation time of the Nth time may be 10 seconds, where N is a positive integer which is greater than 1.

2. The motor controller enables that the non-excitation time is varied with an input voltage, where the input voltage may be a power supply voltage. The input voltage detecting unit may generate a second detecting signal to the non-excitation time modulating unit, so as to represent the input voltage. The non-excitation time modulating unit may modulate the non-excitation time based on the second detecting signal. When the input voltage increases, the non-excitation time increases. For example, when the input voltage is equal to a first voltage, the non-excitation time may be 5 seconds. When the input voltage is equal to a second voltage, the non-excitation time may be 10 seconds, where the second voltage is greater than the first voltage.

3. The motor controller enables that the non-excitation time is varied with a temperature. The temperature detecting unit may generate a third detecting signal to the non-excitation time modulating unit, so as to represent the temperature. The non-excitation time modulating unit may modulate the non-excitation time based on the third detecting signal. When the temperature increases, the non-excitation time increases. For example, when the temperature is 25° C., the non-excitation time may be 5 seconds. When the temperature is 80° C., the non-excitation time may be 10 seconds.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
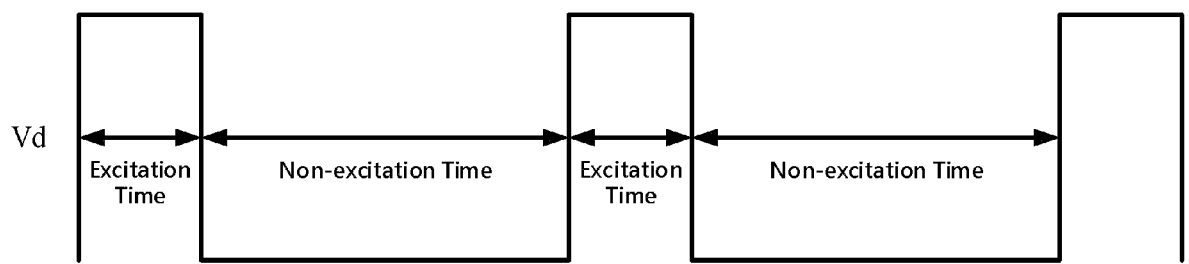
FIG. 1 shows a timing chart of a conventional driving signal.
Figure 2:
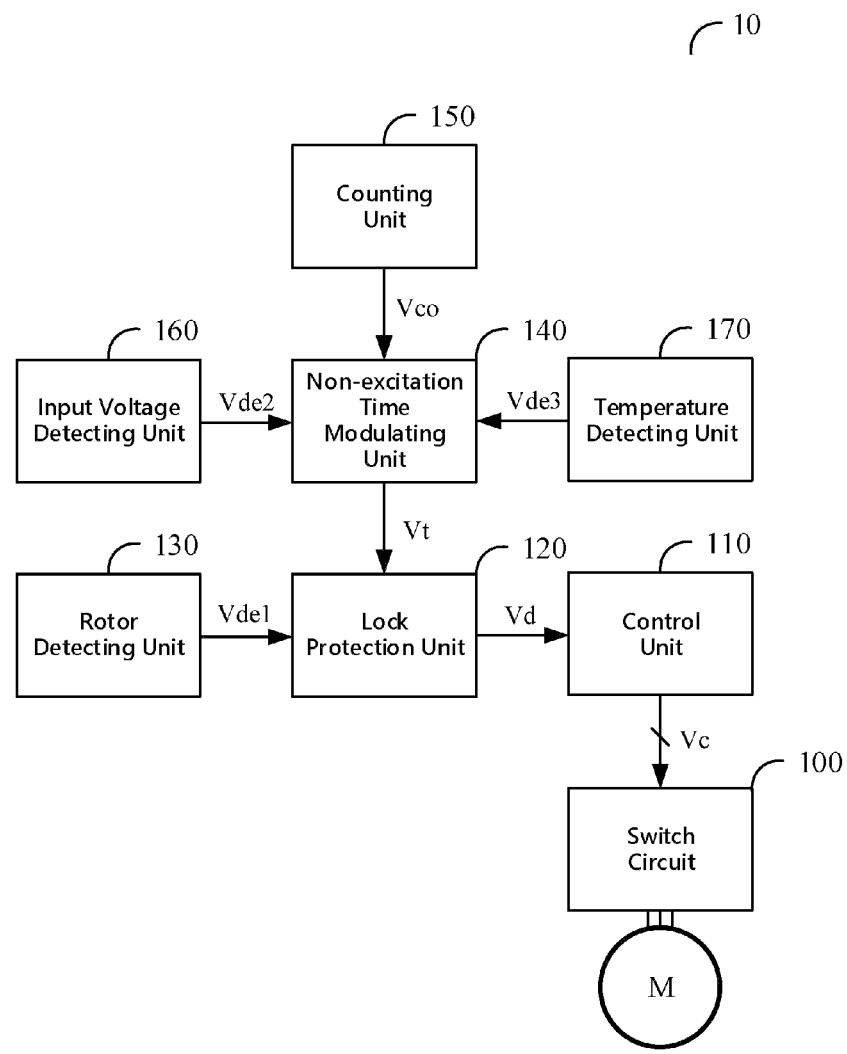
FIG. 2 is a schematic diagram showing a motor controller according to one embodiment of the present invention.
Figure 3:
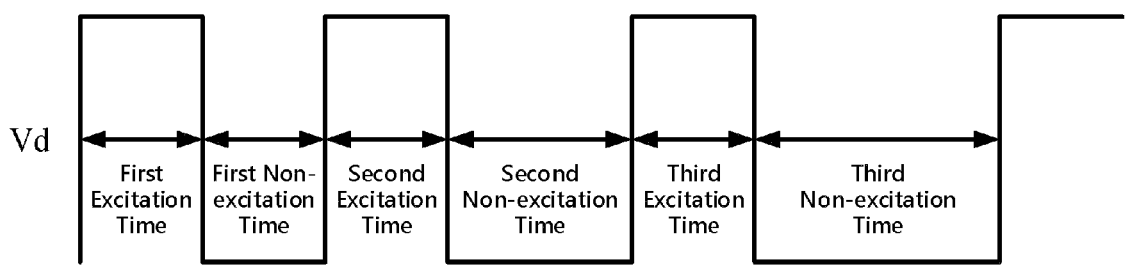
FIG. 3 shows a timing chart of a driving signal according to one embodiment of the present invention.
Figure 4:
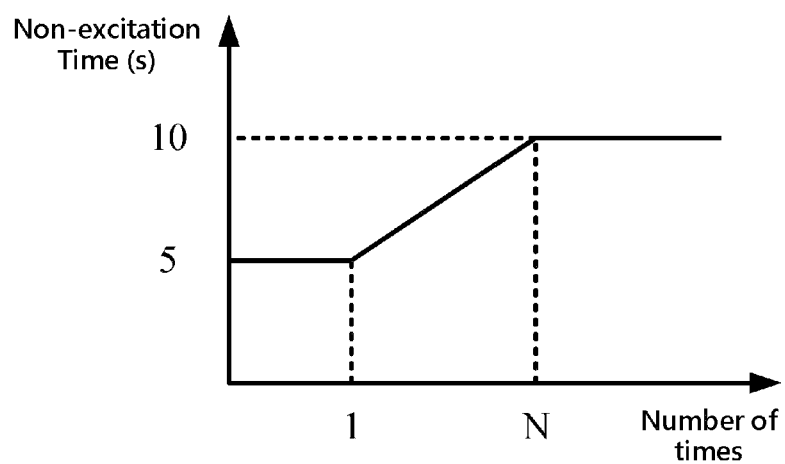
FIG. 4 shows a relation chart between the non-excitation time and the number of times according to the first embodiment of the present invention.

FIG. 2 is a schematic diagram showing a motor controller 10 according to one embodiment of the present invention. The motor controller 10 is used for driving a motor M. The motor controller 10 comprises a switch circuit 100, a control unit 110, a lock protection unit 120, a rotor detecting unit 130, a non-excitation time modulating unit 140, a counting unit 150, an input voltage detecting unit 160, and a temperature detecting unit 170. The switch circuit 100 is coupled to the motor M, so as to drive the motor M. The motor M has a rotor and the motor M may be a three-phase motor. When the motor M is a three-phase motor, the switch circuit 100 may include three half bridge circuits to drive the motor M. The control unit 110 generates a control signal Vc to the switch circuit 100, so as to control the switch circuit 100. The rotor detecting unit 130 generates a first detecting signal Vde1 to the lock protection unit 120, so as to inform the lock protection unit 120 whether the motor M is in a locked state. For example, the rotor detecting unit 130 may determine whether the motor M is in the locked state by detecting the rotor speed or the rotor temperature. The lock protection unit 120 is coupled to the control unit 110, so as to generate a driving signal Vd to the control unit 110, where the driving signal Vd has an excitation time and a non-excitation time. When the motor M is in the locked state, the motor controller 10 may enable that the excitation time is a fixed value and the non-excitation time is a variable value, so as to achieve a lock protection function. The non-excitation time modulating unit 140 generates a timing signal Vt to the lock protection unit 120, so as to represent the non-excitation time. FIG. 3 shows a timing chart of the driving signal Vd according to one embodiment of the present invention. For example, the driving signal Vd may have a first excitation time, a first non-excitation time, a second excitation time, a second non-excitation time, a third excitation time, and a third non-excitation time. The motor controller 10 may enable that the first excitation time is equal to the second excitation time and the second excitation time is equal to the third excitation time. The motor controller 10 may enable that the second non-excitation time is greater than the first non-excitation time and the third non-excitation time is greater than the second non-excitation time. By such control mechanism, the motor controller 10 may increase a number of restarting times within a limited time and enhance a starting success rate. That is to say, the motor controller 10 may solve a delayed start issue and increase the efficiency of the system. Moreover, the motor controller 10 may enable that the second non-excitation time is greater than the second excitation time and the third non-excitation time is greater than the third excitation time, so as to decrease the temperature and achieve the lock protection function. According to the present invention, there are at least three embodiments as follows:

1. The motor controller 10 enables that the non-excitation time is varied with a number of times. When the motor M is in the locked state, the motor controller 10 may enable that the non-excitation time of the first time is a smaller value while the non-excitation time of the second time is a larger value. That is, when the number of times increases, the non-excitation time increases. The counting unit 150 may generate a counting signal Vco to the non-excitation time modulating unit 140, so as to represent the number of times. The non-excitation time modulating unit 140 may modulate the non-excitation time based on the counting signal Vco. After the motor controller 10 starts the motor M successfully, the counting unit 150 may be reset to recount the number of times. FIG. 4 shows a relation chart between the non-excitation time and the number of times according to the first embodiment of the present invention. For example, the non-excitation time of the first time may be 5 seconds while the non-excitation time of the Nth time may be 10 seconds, where N is a positive integer which is greater than 1. As shown in FIG. 4, the non-excitation time may be proportional to the number of times. By increasing the non-excitation time gradually, the motor controller 10 may increase a number of restarting times within a limited time and achieve a lock protection function.

Figure 5:
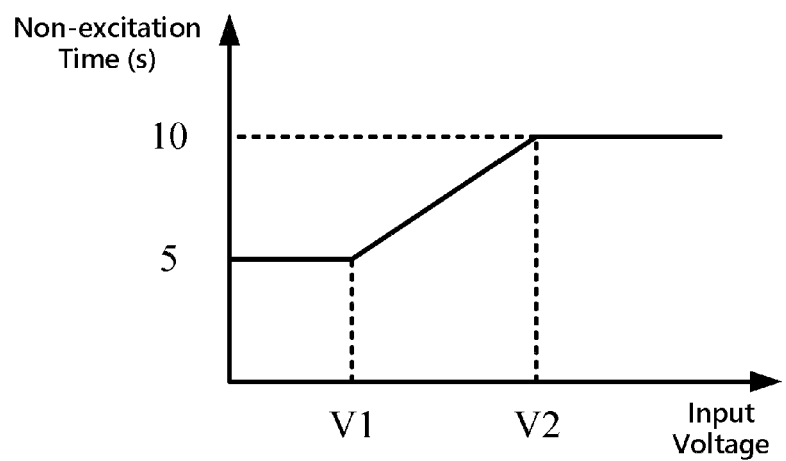
FIG. 5 shows a relation chart between the non-excitation time and the input voltage according to the second embodiment of the present invention.

2. The motor controller 10 enables that the non-excitation time is varied with an input voltage, where the input voltage may be a power supply voltage. The input voltage detecting unit 160 may generate a second detecting signal Vde2 to the non-excitation time modulating unit 140, so as to represent the input voltage. The non-excitation time modulating unit 140 may modulate the non-excitation time based on the second detecting signal Vde2. When the input voltage increases, the non-excitation time increases. FIG. 5 shows a relation chart between the non-excitation time and the input voltage according to the second embodiment of the present invention. For example, when the input voltage is equal to a first voltage V1, the non-excitation time may be 5 seconds. When the input voltage is equal to a second voltage V2, the non-excitation time may be 10 seconds, where the second voltage V2 is greater than the first voltage V1. As shown in FIG. 5, the non-excitation time may be proportional to the input voltage. Thus, when the input voltage is low, the motor controller 10 may increase a number of restarting times within a limited time and achieve a lock protection function.

Figure 6:
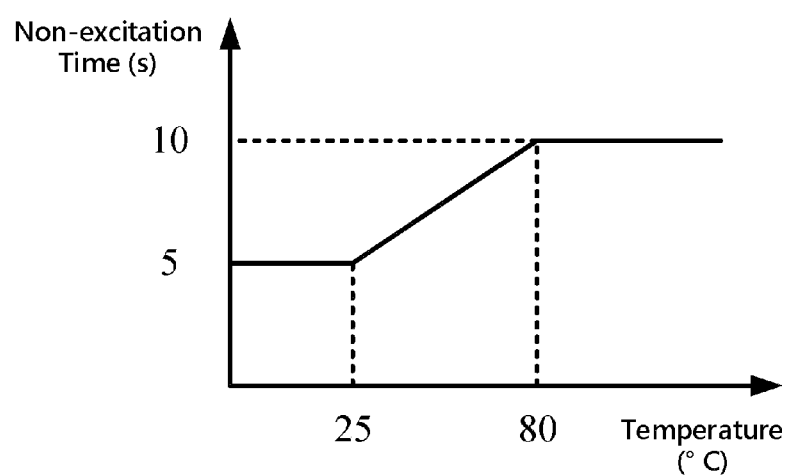
FIG. 6 shows a relation chart between the non-excitation time and the temperature according to the third embodiment of the present invention.

3. The motor controller 10 enables that the non-excitation time is varied with a temperature. The temperature detecting unit 170 may generate a third detecting signal Vde3 to the non-excitation time modulating unit 140, so as to represent the temperature. The non-excitation time modulating unit 140 may modulate the non-excitation time based on the third detecting signal Vde3. When the temperature increases, the non-excitation time increases. FIG. 6 shows a relation chart between the non-excitation time and the temperature according to the third embodiment of the present invention. For example, when the temperature is 25° C., the non-excitation time may be 5 seconds. When the temperature is 80° C., the non-excitation time may be 10 seconds. As shown in FIG. 6, the non-excitation time may be proportional to the temperature. Thus, when the temperature is very low, the motor controller 10 may increase a number of restarting times within a limited time and achieve a lock protection function.

More specifically, the designer may implement the three embodiments, two of the three embodiments, or one of the three embodiments based on the practical need. According to one embodiment of the present invention, the motor controller 10 may be applied to a sensorless motor. The motor controller 10 is configured to determine an excitation time and a non-excitation time. When the motor M is in the locked state, the motor controller 10 may enable that the non-excitation time is a variable value. The motor controller 10 utilizes the non-excitation time to achieve a lock protection function.

While the present invention has been described by the preferred embodiments, it is to be understood that the invention is not limited to the disclosed embodiments. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller comprising:
a switch circuit, coupled to a motor for driving the motor;
a control unit, configured to generate a control signal to control the switch circuit, wherein the motor controller determines a non-excitation time, when the motor is in a locked state, the motor controller enables that the non-excitation time is a variable value, the motor controller generates a driving signal, and the driving signal has the non-excitation time;
a lock protection unit, coupled to the control unit, wherein the lock protection unit is configured to generate the driving signal to the control unit; and
a non-excitation time modulating unit, configured to generate a timing signal to the lock protection unit.

2. The motor controller of claim 1, wherein the motor controller utilizes the non-excitation time to achieve a lock protection function.

3. The motor controller of claim 1, wherein the motor controller utilizes the non-excitation time to achieve a lock protection function.

4. The motor controller of claim 1, wherein the motor controller determines whether the motor is in the locked state by detecting a rotor temperature.

5. The motor controller of claim 1, wherein the motor controller further comprises a rotor detecting unit, and the rotor detecting unit generates a first detecting signal to the lock protection unit.

6. The motor controller of claim 1, wherein the motor controller further comprises a counting unit, and the counting unit generates a counting signal to the non-excitation time modulating unit.

7. The motor controller of claim 6, wherein after the motor controller starts the motor successfully, the counting unit is reset.

8. The motor controller of claim 1, wherein the motor controller further comprises an input voltage detecting unit, and the input voltage detecting unit generates a second detecting signal to the non-excitation time modulating unit.

9. The motor controller of claim 1, wherein the motor controller further comprises a temperature detecting unit, and the temperature detecting unit generates a third detecting signal to the non-excitation time modulating unit.

10. The motor controller of claim 1, wherein the motor controller determines an excitation time, and when the motor is in the locked state, the motor controller enables that the excitation time is a fixed value.

11. The motor controller of claim 1, wherein the motor controller enables that the non-excitation time is varied with a number of times.

12. The motor controller of claim 11, wherein when the number of times increases, the non-excitation time increases.

13. The motor controller of claim 1, wherein the motor controller enables that the non-excitation time is varied with an input voltage.

14. The motor controller of claim 13, wherein the input voltage is a power supply voltage.

15. The motor controller of claim 13, wherein when the input voltage increases, the non-excitation time increases.

16. The motor controller of claim 1, wherein the motor controller enables that the non-excitation time is varied with a temperature.

17. The motor controller of claim 16, wherein when the temperature increases, the non-excitation time increases.

18. The motor controller of claim 1, wherein the motor is a three-phase motor.

19. The motor controller of claim 1, wherein the motor controller is applied to a sensorless motor.

20. The motor controller of claim 1, wherein the motor controller increases a number of restarting times within a limited time.

21. The motor controller of claim 1, wherein the motor controller is configured to enhance a starting success rate.

* * * * *